United States Patent
Paulzagade et al.

(10) Patent No.: US 10,127,119 B1
(45) Date of Patent: Nov. 13, 2018

(54) SYSTEMS AND METHODS FOR MODIFYING TRACK LOGS DURING RESTORE PROCESSES

(71) Applicant: Veritas Technologies LLC, Mountain View, CA (US)

(72) Inventors: Sudhakar Paulzagade, Pune (IN); Saurabh Jain, Jabalpur (IN); Chirag Dalal, Pune (IN); Siddharth Karandikar, Pune (IN)

(73) Assignee: Veritas Technologies, LLC, Mountain View, CA (US)

( * ) Notice: Subject to any disclaimer, the term of this patent is extended or adjusted under 35 U.S.C. 154(b) by 5 days.

(21) Appl. No.: 14/283,742

(22) Filed: May 21, 2014

(51) Int. Cl.
G06F 11/00 (2006.01)
G06F 11/14 (2006.01)

(52) U.S. Cl.
CPC ...... G06F 11/1469 (2013.01); G06F 11/1471 (2013.01)

(58) Field of Classification Search
CPC .............. G06F 11/1453; G06F 11/1471; G06F 11/1402; G06F 11/1435
See application file for complete search history.

(56) References Cited

U.S. PATENT DOCUMENTS

| | | | | | |
|---|---|---|---|---|---|
| 4,878,167 A | * | 10/1989 | Kapulka | ........... | G06F 17/30377 714/16 |
| 5,170,480 A | * | 12/1992 | Mohan | .............. | G06F 17/30575 |
| 5,720,026 A | * | 2/1998 | Uemura | .............. | G06F 11/1451 707/999.202 |
| 5,764,877 A | * | 6/1998 | Lomet | ................. | G06F 11/1451 707/999.003 |
| 5,974,563 A | * | 10/1999 | Beeler, Jr. | ........... | G06F 11/2071 707/999.202 |
| 6,073,128 A | * | 6/2000 | Pongracz | ............ | G06F 11/1469 707/640 |
| 6,397,351 B1 | * | 5/2002 | Miller | ................. | G06F 11/1469 714/13 |
| 6,453,325 B1 | * | 9/2002 | Cabrera | .............. | G06F 11/1461 |
| 7,035,880 B1 | * | 4/2006 | Crescenti | ............ | G06F 11/1464 |
| 7,725,428 B1 | * | 5/2010 | Hawkins | ............. | G06F 11/1469 |
| 9,009,430 B2 | * | 4/2015 | Augenstein | ......... | G06F 11/1469 711/162 |

(Continued)

OTHER PUBLICATIONS

Incremental Backup, Mar. 9, 2011, TechTarget, pp. 1-2.*

*Primary Examiner* — Bryce P Bonzo
*Assistant Examiner* — Jonathan D Gibson
(74) *Attorney, Agent, or Firm* — FisherBroyles LLP

(57) ABSTRACT

The disclosed computer-implemented method for modifying track logs during restore processes may include (1) identifying a backup application that maintains a track log used to identify changed blocks during backup operations, (2) detecting a restore process launched by the backup application to restore at least one block backed up in a backup image, (3) retrieving, from the backup image, block information about the block being restored by the restore process, and then (4) recording the block information to the track log during the restore process such that the backup application does not identify the block as changed during a subsequent backup operation due at least in part to the block already being backed up in the backup image. Various other methods, systems, and computer-readable media are also disclosed.

20 Claims, 6 Drawing Sheets

(56) References Cited

U.S. PATENT DOCUMENTS

| | | | | |
|---|---|---|---|---|
| 9,411,692 B2* | 8/2016 | Graefe | ............... | G06F 11/1451 |
| 2003/0163493 A1* | 8/2003 | Burns | ............... | G06F 11/1469 |
| 2007/0220321 A1* | 9/2007 | Iqbal | ............... | G06F 11/1461 |
| | | | | 714/13 |
| 2010/0318746 A1* | 12/2010 | Troxel | ............... | G06F 11/1438 |
| | | | | 711/141 |
| 2011/0231362 A1* | 9/2011 | Attarde | ............... | G06F 11/3442 |
| | | | | 707/609 |
| 2012/0239894 A1* | 9/2012 | Chen | ............... | G06F 11/1456 |
| | | | | 711/162 |
| 2017/0132095 A1* | 5/2017 | Graefe | ............... | G06F 11/1662 |

* cited by examiner

SYSTEMS AND METHODS FOR MODIFYING TRACK LOGS DURING RESTORE PROCESSES

BACKGROUND

In today's world of vast computing technology, many technology users rely on backup images to preserve important data in the event of a system failure and/or disaster. While computing technology has experienced numerous advances and improvements over the years, some computing systems may still be vulnerable to a wide variety of temporary and/or fatal errors that potentially result in the loss of data and/or services. Unfortunately, even a temporary loss of data and/or services may be devastating to certain technology users.

For example, an enterprise may need to maintain substantially consistent access to various data and/or services in connection with a product provided to the enterprise's customer base. In this example, the ability to quickly recover and/or restore the enterprise's systems from a backup image may be crucial to the product's success and/or customer satisfaction. To facilitate this ability, the enterprise may implement a traditional backup and restore technology that creates and/or copies backup images of the enterprise's systems. This backup and restore technology may use a system's track log at the time of backup to determine which data is already backed up and/or which data has changed within the system.

However, in the event that this backup and restore technology has restored certain data from a backup image since the last backup, the system's track log may appear to indicate that the restored data has changed even though the data is already backed up in the backup image. As a result, the backup and restore technology may superfluously process the data during a subsequent backup, thereby potentially leading to a longer backup time and/or inefficient resource consumption. The instant disclosure, therefore, identifies and addresses a need for additional and improved systems and methods for modifying track logs during restore processes.

SUMMARY

As will be described in greater detail below, the instant disclosure describes various systems and methods for modifying track logs during restore processes by recording information about restored blocks and/or objects to the track logs. By keeping the track log up to date in this manner, the various systems and methods described herein may prevent such restored blocks and/or objects from being needlessly processed and/or backed up during subsequent backup operations.

In one example, a computer-implemented method for modifying track logs during restore processes may include (1) identifying a backup application that maintains a track log used to identify changed blocks during backup operations, (2) detecting a restore process launched by the backup application to restore at least one block backed up in a backup image, (3) retrieving, from the backup image, block information about the block being restored by the restore process, and then (4) recording the block information to the track log during the restore process such that the backup application does not identify the block as changed during a subsequent backup operation due at least in part to the block already being backed up in the backup image.

Recording the information may include modifying the track log and/or creating a new track log depending on the type of restore operation. In one embodiment, detecting the restore process launched by the backup application may include detecting the restore process that restores a complete copy of the backup image to a computing system and recording the block information to the track log may include creating a new track log for the backup application in connection with the restore process. Additionally or alternatively, detecting the restore process launched by the backup application may include detecting the restore process that restores a partial copy of the backup image to a computing system and recording the block information to the track log may include modifying an existing track log for the backup application in connection with the restore process.

The block information may be stored in the track log in a variety of forms. In one embodiment, retrieving the block information may include retrieving a hash of the block being restored by the restore process and recording the block information to the track log may include recording the hash of the block to the track log. Additionally or alternatively, retrieving the block information may include retrieving object information about an object that contains the block and recording the block information to the track log may include recording the object information to the track log. In some examples, the object information may include (1) metadata about the object, (2) a size of the object, (3) an identifier of the object, (4) a timestamp of a backup image containing a stored image of the object, (5) an identifier of a backup image containing a stored image of the object, and/or (6) a hash of the object.

In some examples, recording block information during restore may prevent the generation of redundant information about backed-up data. For example, the computer-implemented method may further include (1) detecting a subsequent backup operation, (2) reading, during the subsequent backup operation, the track log to determine that the block is already stored in the backup image, and then (3) processing the subsequent backup operation without generating a duplicate copy of the block information due at least in part to the block information already being stored in the backup image.

In one embodiment, a system for implementing the above-described method may include (1) an identification module, stored in memory, that identifies a backup application that maintains a track log used to identify changed blocks during backup operations, (2) a detection module, stored in memory, that detects a restore process launched by the backup application to restore at least one block backed up in a backup image, (3) a retrieval module, stored in memory, that retrieves, from the backup image, block information about the block being restored by the restore process, (4) a recording module, stored in memory, that records the block information to the track log during the restore process such that the backup application does not identify the block as changed during a subsequent backup operation due at least in part to the block already being backed up in the backup image, and (5) at least one physical processor configured to execute the identification module, the detection module, the retrieval module, and the recording module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a backup application that maintains a track log used to identify changed blocks during backup operations, (2) detect a restore process launched by the backup application to restore at least one block backed up in a backup image, (3) retrieve, from the backup image, block information about the block being restored by the restore process, and then (4) record the block information to the track log during the restore process such that the backup application does not identify the block as changed during a subsequent backup operation due at least in part to the block already being backed up in the backup image. Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
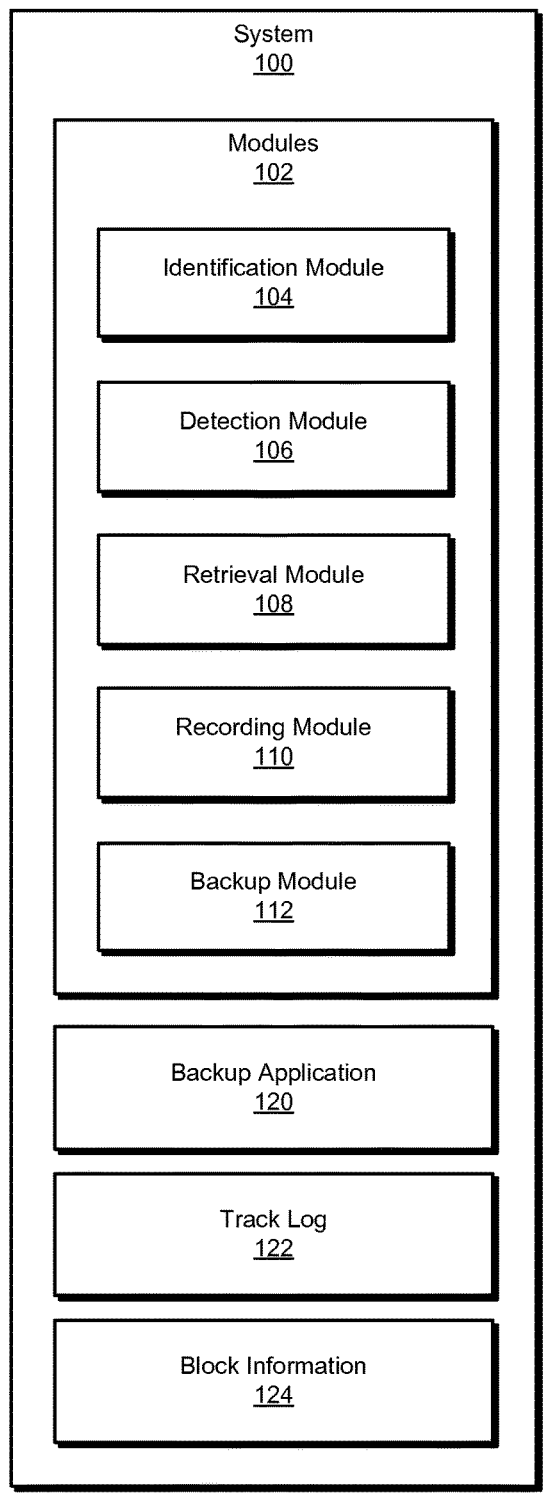
FIG. 1 is a block diagram of an exemplary system for modifying track logs during restore processes.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for modifying track logs during restore processes. As will be explained in greater detail below, by recording information about restored data to track logs during restore processes, the various systems and methods described herein may prevent the restored data from being superfluously processed and/or backed up during subsequent backup operations.

Figure 2:
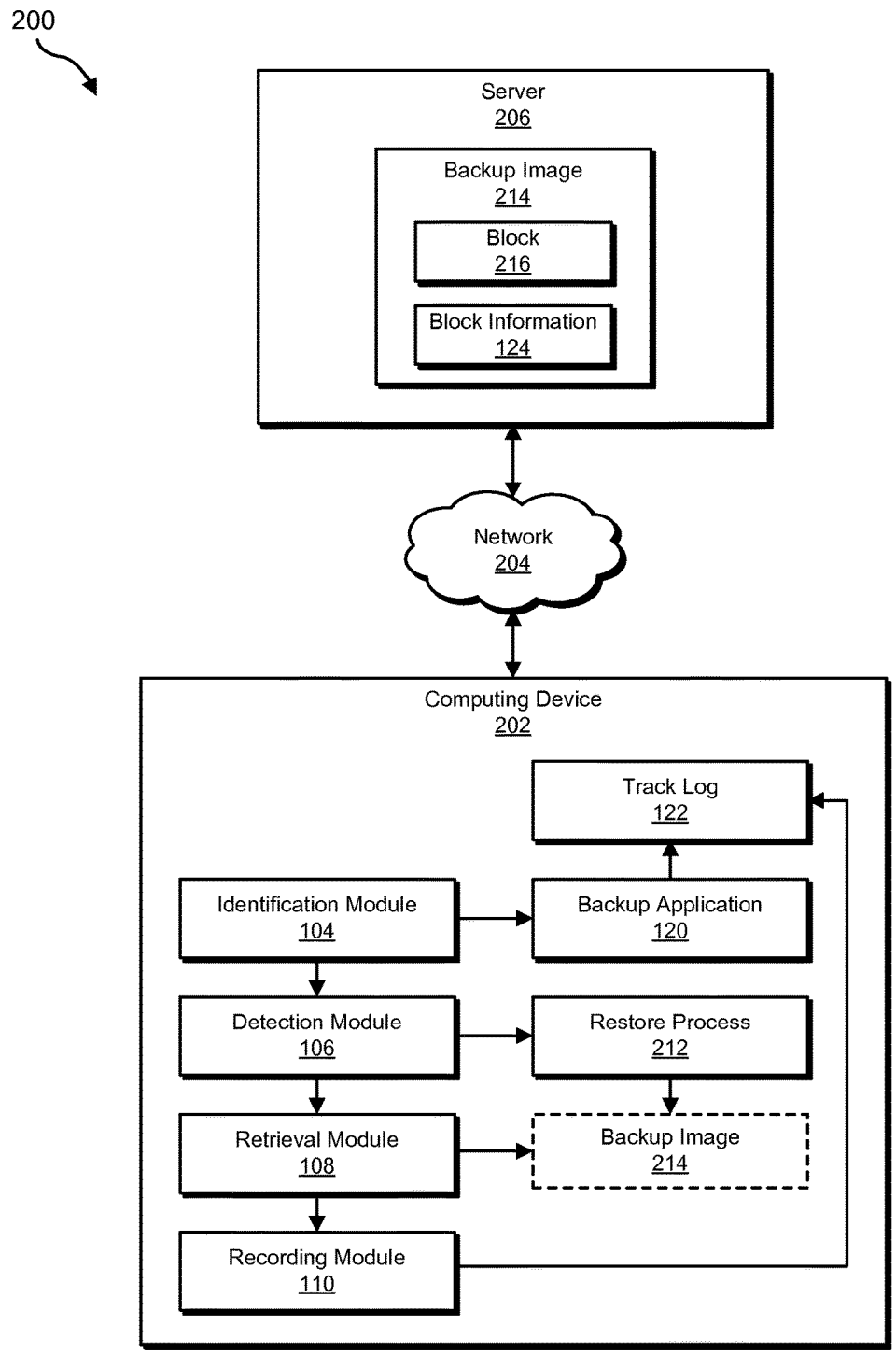
FIG. 2 is a block diagram of an additional exemplary system for modifying track logs during restore processes.
Figure 3:
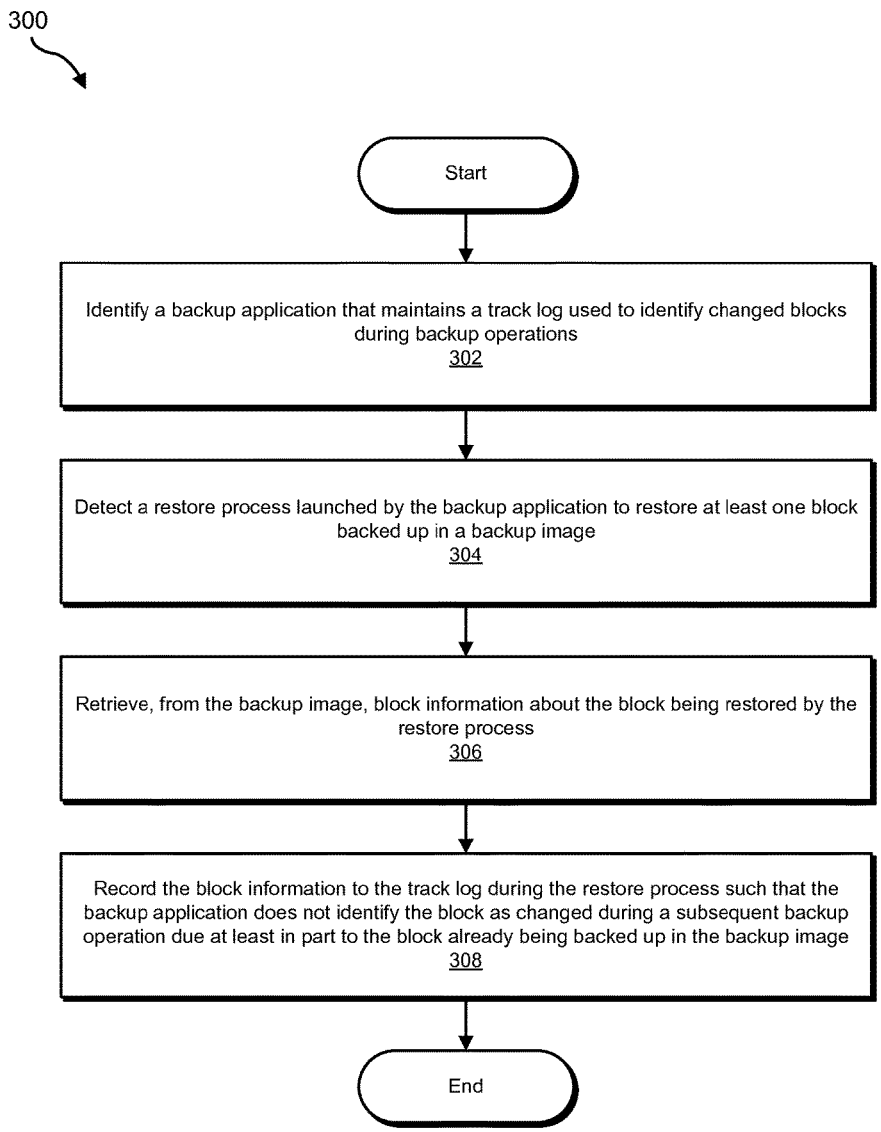
FIG. 3 is a flow diagram of an exemplary method for modifying track logs during restore processes.
Figure 4:
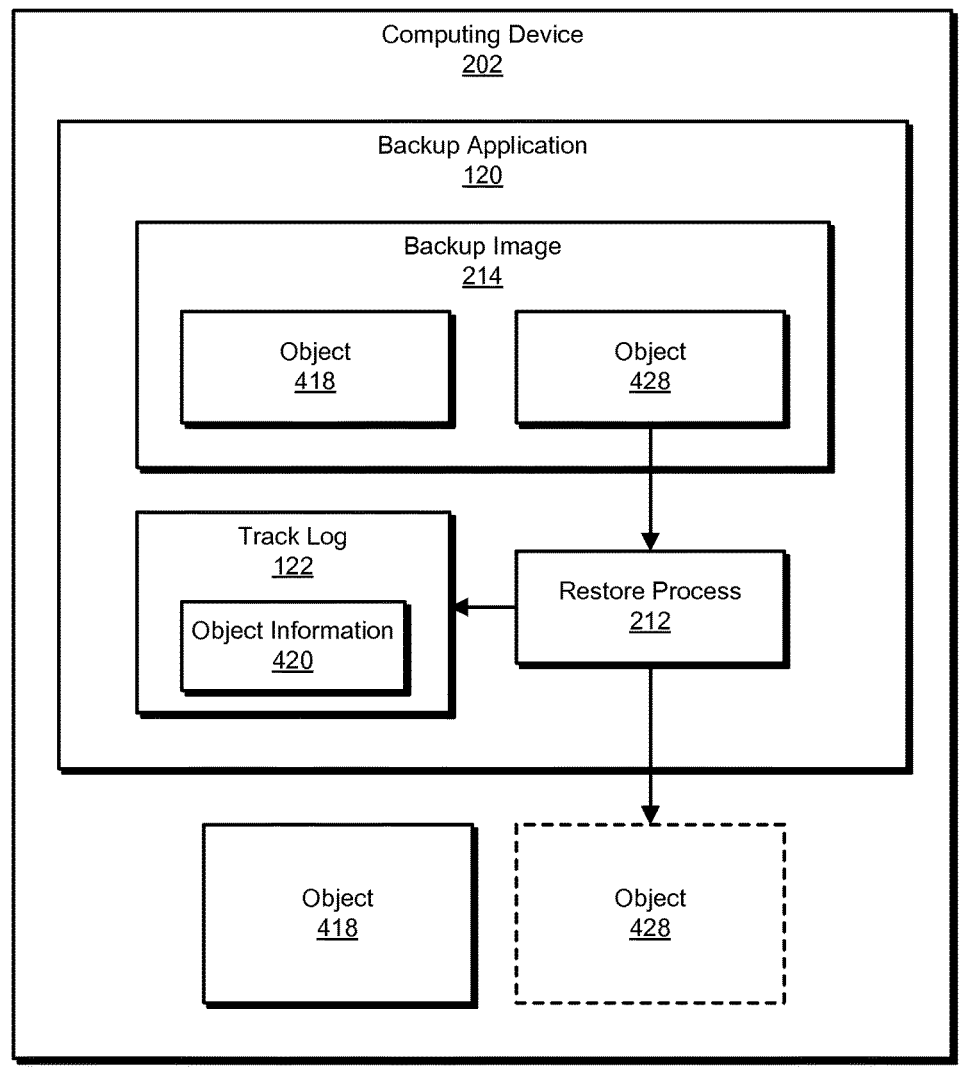
FIG. 4 is a block diagram of an exemplary system for modifying track logs during restore processes.

The following will provide, with reference to FIGS. 1, 2, and 4, detailed descriptions of exemplary systems for modifying track logs during restore processes. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for modifying track logs during restore processes. As illustrated in this figure, exemplary system 100 may include one or more modules 102 for performing one or more tasks. For example, and as will be explained in greater detail below, exemplary system 100 may include an identification module 104 that identifies a backup application that maintains a track log used to identify changed blocks during backup operations. Exemplary system 100 may additionally include a detection module 106 that detects a restore process launched by the backup application to restore at least one block backed up in a backup image. Exemplary system 100 may also include a retrieval module 108 that retrieves, from the backup image, block information about the block being restored by the restore process. Exemplary system 100 may additionally include a recording module 110 that records the block information to the track log during the restore process such that the backup application does not identify the block as changed during a subsequent backup operation due at least in part to the block already being backed up in the backup image.

In some embodiments, exemplary system 100 may include a backup module 112 that reads the track log to determine that the block is already stored in the backup image and then processes the subsequent backup operation without generating a duplicate copy of the block information due at least in part to the block information already being stored in the backup image. Although illustrated as separate elements, one or more of modules 102 in FIG. 1 may represent portions of a single module or application (such as SYMANTEC BACKUP EXEC, SYMANTEC NETBACKUP, SYMANTEC NORTON GHOST, ACRONIS TRUE IMAGE, ACRONIS BACKUP & RECOVERY, GENIE BACKUP HOME, COMMVAULT SIMPANA, SYSTEM RESTORE, and/or SYNCBACK).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more backup applications, such as backup application 120. The phrase "backup application," as used herein, generally refers to any type or form of application that backs up data from and/or restores data to a computing system. In some examples, backup application 120 may take one or more snapshots of a file, an application, and/or a computing system. Additionally or alternatively, backup application 120 may restore a file, an application, and/or a computing system from a snapshot. Examples of backup application 120 include, without limitation, SYMANTEC BACKUP EXEC, SYMANTEC NETBACKUP, SYMANTEC NORTON GHOST, ACRONIS TRUE IMAGE, ACRONIS BACKUP & RECOVERY, GENIE BACKUP HOME, COMMVAULT SIMPANA NETBACKUP, SYSTEM RESTORE, SYNCBACK, and/or any other suitable backup application.

In some examples, backup application 120 may restore all of a backup image and/or snapshot to a computing system. Additionally or alternatively, backup application 120 may restore only a portion of a backup image and/or snapshot to a computing system.

In some examples, backup application 120 may include a client-side backup component. Additionally or alternatively, backup application 120 may include a server-side backup component. Backup application 120 may also represent a combination of client-side and server-side components that collectively facilitate backing up and/or restoring data. Moreover, backup application 120 may include one or more of modules 102 (even though backup application 120 and modules 102 are illustrated as separate elements in FIG. 2).

As illustrated in FIG. 1, exemplary system 100 may also include one or more track logs, such as track log 122. The phrase "track log," as used herein, generally refers to any type or form of log and/or record that identifies blocks, objects, files, folders, applications, and/or computing systems backed up and/or restored by a backup application. In some embodiments, track log 122 may represent a record of changes made to data stored on a computing system. In such embodiments, track log 122 may identify these changes at the block level and/or the object level. Examples of information identified by track log 122 include, without limitation, timestamps of backup images, hashes of objects backed up in backup images, identifiers that identify backup images, metadata about blocks and/or objects backed up in backup images, combinations of one or more of the same, and/or any other suitable track log.

As illustrated in FIG. 1, exemplary system 100 may also include block information, such as block information 124. The phrase "block information," as used herein, generally refers to any type or form of information about one or more data blocks and/or data objects. Examples of block information 124 include, without limitation, metadata about blocks and/or objects, hashes of blocks and/or objects, identifiers that identify blocks and/or objects, timestamps of the most recent backups of certain blocks and/or objects, block and/or objects sizes, "ctime" timestamps, "mtime" timestamps, identifiers of the most recent backups of certain blocks and/or objects, combinations of one or more of the same, and/or any other suitable block information.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may host at least a portion of backup application 120. Additionally or alternatively, computing device 202 may perform at least a portion of a restore process 212 from a backup image 214.

The phrase "restore process," as used herein, generally refers to any type or form of process, procedure, and/or operation that restores at least a portion of a computing system to a previous state. In some embodiments, restore process 212 may restore computing device 202 to a previous state captured in and/or represented by backup image 214. For example, restore process 212 may achieve a partial restore of computing device 202 from backup image 214. Additionally or alternatively, restore process 212 may achieve a full restore of computing device 202 from backup image 214.

The phrase "backup image," as used herein, generally refers to any type or form of stored image that facilitates restoration of at least a portion of a computing system to a previous state. In some embodiments, backup image 124 may include various data backed up from computing device 202. Additionally or alternatively, backup image 124 may include various metadata backed up from computing device 202. Examples of backup image 214 include, without limitation, full backup images, incremental backup images, differential backup images, accelerated backup images, deduplicated backup images, synthetic backup images, snapshots, combinations of one or more of the same, or any other suitable backup images.

In one example, server 206 may be programmed with one or more of modules 102 and/or may host at least a portion of backup application 120. Additionally or alternatively, server 206 may store backup image 214. Backup image 214 may include block 216 and/or block information 124.

The term "block," as used herein, generally refers to the smallest increment of data stored within a backup image. In some embodiments, block 216 may represent an entire object. Additionally or alternatively, block 216 may represent only a portion (e.g., less than all) of an object. Examples of block 216 include, without limitation, a single byte, a predefined number of bytes, a predefined portion of an object, an entire object, combinations of one or more of the same, and/or any other suitable block of data.

In one embodiment, one or more of modules 102 from FIG. 1 may, when executed by at least one processor of computing device 202, enable computing device 202 to modify track logs during restore processes. For example, and as will be described in greater detail below, identification module 104 may identify backup application 120 that maintains track log 122 used to identify changed blocks during backup operations. At some point, detection module 106 may detect a restore process 212 launched by backup application 120 to restore at least one block 216 backed up in a backup image 214. Next, retrieval module 108 may retrieve, from backup image 214, block information 124 about block 216 being restored by restore process 212. Finally, recording module 110 may record block information 124 to track log 122 during restore process 212 such that backup application 120 does not identify block 216 as changed during a subsequent backup operation due at least in part to block 216 already being backed up in backup image 214.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Server 206 generally represents any type or form of computing device capable of storing and/or facilitating restoration of backup data. Examples of server 206 include, without limitation, media servers, backup servers, application servers, web servers, storage servers, and/or database servers configured to run certain software applications and/or provide various media, backup, web, storage, and/or database services.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC) networks, a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and server 206.

FIG. 3 is a flow diagram of an exemplary computer-implemented method 300 for modifying track logs during restore processes. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a backup application that maintains a track log used to identify changed blocks during backup operations. For example, at step 302 identification module 104 may, as part of computing device 202 and/or server 206 in FIG. 2, identify backup application 120 that maintains track log 122 used to identify changed blocks during backup operations. In this example, track log 122 may represent a record of changes made to data stored on computing device 202.

Identification module 104 may identify backup application 120 in a variety of ways and/or contexts. For example, identification module 104 may identify backup application 120 installed on computing device 202. In this example, backup application 120 may create backup images of computing device 202. Backup application 120 may direct computing device 202 to transfer these backup images to server 206 via network 204. Server 206 may then store these backup images to facilitate restoration of computing device 202 from these backup images at a later point in time.

Additionally or alternatively, identification module 104 may identify backup application 120 installed on server 206. In this example, backup application 120 may create backup images of computing device 202 and/or one or more additional computing devices (not illustrated in FIG. 2). Backup application 120 may then store these backup images on server 206 to facilitate restoration of such devices from these backup images at a later point in time.

Returning to FIG. 3, at step 304 one or more of the systems described herein may detect a restore process launched by the backup application to restore at least one block backed up in a backup image. For example, at step 304 detection module 106 may, as part of computing device 202 and/or server 206 in FIG. 2, detect restore process 212 launched by backup application 120 to restore block 216 backed up in backup image 214. In this example, restore process 212 may restore a complete copy of backup image 214 to computing device 202. Additionally or alternatively, restore process 212 may restore a partial copy of backup image 214 to computing device 202.

Detection module 106 may detect restore process 212 launched by backup application 120 in a variety of ways and/or contests. For example, detection module 106 may detect restore process 212 by monitoring backup application 120. In one example, detection module 106 may monitor backup application 120 to detect when backup application 120 launches backup operations and/or restore processes. While monitoring backup application 120 in this way, detection module 106 may detect restore process 212.

Additionally or alternatively, detection module 106 may detect restore process 212 by monitoring track log 122. For example, detection module 106 may monitor track log 122 to detect when backup application 120 attempts to modify track log 122 in connection with backup operations and/or restore processes. While monitoring track log 122 in this way, detection module 106 may detect an attempt to modify track log 122 in connection with restore process 212. Detection module 106 may then determine that backup application 120 has launched restore process 212 based at least in part on this attempt to modify track log 122.

Returning to FIG. 3, at step 306 one or more of the systems described herein may retrieve, from the backup image, block information about the block being restored by the restore process. For example, at step 306 retrieval module 108 may, as part of computing device 202 and/or server 206 in FIG. 2, retrieve block information 124 about block 216 from backup image 214 during restore process 212. In this example, block information 124 may include a hash of block 216 being restored by restore process 212. Examples of such a hash include, without limitation, Secure Hash Algorithm (SHA) hashes, Message-Digest 5 (MD5) hashes, and/or any other suitable hash.

Additionally or alternatively, block information 124 may include object information about an object that contains block 216. Examples of such object information include, without limitation, metadata about the object, the object size, an object identifier, a timestamp of a backup image that includes the object, an identifier of a backup image that includes the object, a hash of the object, an inode identifier of the object, a "ctime" timestamp, an "mtime" timestamp, combinations of one or more of the same, and/or any other suitable object information.

Retrieval module 108 may retrieve block information 124 in a variety of ways and/or contexts. For example, retrieval module 108 may retrieve block information 124 from backup image 214 by locating backup image 214 on server 206. In one example, retrieval module 108 may determine that restore process 212 is restoring computing device 202 from backup image 214. Retrieval module 108 may then locate backup image 214 on server 206 based at least in part on an identifier of backup image 214 (sometimes referred to as a "backup ID"). Upon locating backup image 214 on server 206, retrieval module 108 may retrieve block information 124 from backup image 214.

Additionally or alternatively, retrieval module 108 may retrieve block information 124 from backup image 214 by locating a copy backup image 214 on computing device 202. In one example, backup application 120 may transfer a copy of backup image 214 from server 206 to computing device 202 during restore process 212. After this transfer, retrieval module 108 may locate the copy of backup image 124 on computing device 202. Retrieval module 108 may then retrieve block information 124 from this copy of backup image 214.

Returning to FIG. 3, at step 308 one or more of the systems described herein may record the block information to the track log during the restore process such that the backup application does not identify the block as changed during a subsequent backup operation due at least in part to the block already being backed up in the backup image. For example, at step 308 recording module 110 may, as part of computing device 202 and/or server 206 in FIG. 2, record block 216 information to track log 122 during restore process 212 such that backup application 120 does not identify block 216 as changed during a subsequent backup operation due at least in part to block 216 already being backed up in backup image 214. In this example, block 216 may represent and/or correspond to (1) a block that is stored on computing device 202 and (2) a backup copy of the block that is backed up in backup image 214.

Recording module 110 may record block information 124 to track log 122 in a variety of ways and/or contexts. In some examples, recording module 110 may record block information 124 to track log 122 by modifying track log 122 in connection with restore process 212. For example, computing device 202 may need a partial restore due at least in part to the deletion and/or corruption of one or more blocks or objects. In this example, computing device 202 may already have an existing track log maintained by backup application 120. Since computing device 202 already has an existing track log, recording module 110 may update an entry corresponding to block 216 in the existing track log with block information 124 copied from backup image 214.

Additionally or alternatively, recording module 110 may create a new entry corresponding to block 216 in the existing track log. Recording module 110 may then copy block information 124 from backup image 214 to this new entry corresponding to block 216.

In some examples, recording module 110 may record block information 124 to track log 122 by creating track log 122 in connection with restore process 212. For example, computing device 202 may need a complete restore due at least in part to a catastrophic failure and/or disaster. In this example, computing device 202 may no longer have a track log maintained by backup application 120. Since computing device 202 no longer has such a track log, recording module 110 may create a new track log for backup application 120 on computing device 202. Recording module 110 may then copy block information 124 from backup image 214 to this new track log.

Additionally or alternatively, computing device 202 may implement a complete restore to avoid a lengthy configuration and/or as part of a cloning process. In this example, computing device 202 may not have a track log maintained by backup application 120. Since computing device 202 does not have such a track log, recording module 110 may create a new track log for backup application 120 on computing device 202. Recording module 110 may then copy block information 124 from backup image 214 to this new track log.

FIG. 4 illustrates an exemplary system for modifying track logs during restore processes. As illustrated in FIG. 4, computing device 202 may include backup application 120 and an object 418. In this example, backup application 120 may launch restore process 212 to restore an object 428 (which may have been inadvertently deleted) to computing device 202. During restore process 212, backup application 120 may (1) obtain backup image 214 that includes backup copies of object 418 and/or object 428, (2) restore object 428 from backup image 214 to computing device 202, and then (3) write object information 420 about object 428 to track log 410. Since computing device 202 already includes object 418, backup application 120 may have no reason to restore object 418 from backup image 214 to computing device 202.

In some examples, exemplary method 300 may include one or more additional steps not illustrated in FIG. 3. In one example, detection module 106 may detect a backup operation performed on computing device 202 subsequent to restore process 212. Examples of such a backup operation include, without limitation, full backup operations, incremental backup operations, differential backup operations, accelerated backup operations, deduplicated backup operations, synthetic backup operations, snapshot operations, combinations of one or more of the same, or any other suitable backup operation.

Additionally or alternatively, one or more of the systems described herein may read, during the subsequent backup operation, the track log to determine that the block is already stored in the backup image. For example, backup module 112 may read, during the subsequent backup operation, track log 122 to determine that block 216 is already stored in a backup image. In response to this determination, backup module 112 may process the subsequent backup operation without generating a duplicate copy of block information 124 due at least in part to block information 124 already being stored in a backup image.

As a specific example, recording module 110 may update the inode identifier of block 216 during restore process 212. In this example, block 216 may include an inode. The term "inode," as used herein, generally refers to any type or form of data structure that represents a file system object (such as a file and/or a directory).

During the next backup operation, backup module 112 may read track log 122 and determine that block 216 identified by the inode identifier is already backed up in a backup image. As a result, backup module 112 may avoid redundantly backing up block 216 during this backup operation, thereby potentially leading to a shorter backup time and/or improved conservation of resources. Similarly, backup module 112 may avoid redundantly generating block information 124 about block 216 during this backup operation, thereby potentially leading to a shorter backup time and/or improved conservation of resources.

In contrast, after a restore process has been performed under a traditional approach on a computing device, the inode identifier may appear to indicate that the restored data has changed even though the data is already backed up in a backup image. In other words, the inode identifier may reflect the change made to the data stored on the computing device even though the backed-up data has remained intact. As a result, a traditional backup and restore technology may superfluously process the data stored on the computing device during the next backup, thereby potentially leading to a longer backup time and/or inefficient resource consumption.

As described above, the systems and methods described herein may increase the efficiency of backup operations by updating and/or creating track logs during restore processes. For example, a backup application may retrieve information about blocks and/or objects being restored by a restore process to a computing device. The backup application may then record that information to a track log on the computing device. By recording that information to the track log in this manner, the backup application may prevent the restored blocks and/or objects from being needlessly processed and/or backed up during the next backup operation.

As a specific example, the backup application may back up object "obj1" stored on a client device. Obj1 may include blocks b1, b2, b3 . . . bn and/or may be represented as "obj1 {b1, b2, b3 . . . bn}." Hashes of the blocks within obj1 may be represented as "h(b1), h(b2), h(b3) . . . h(bn)." When a backup of obj1 is created, the backup application may compute these hashes and then store them in a track log along with additional information such as mtime, ctime, a backup identifier, and/or an inode identifier. This track log entry may be represented as "obj1 {h(b1), h(b2), h(b3) . . . h(bn)} ctime mtime inode_id backup_id."

In the event that obj1 is accidentally deleted or corrupted, the backup application may restore obj1 from the backup to the client device as part of a restore operation. In this example, the backup application may create (or recreate) the track log entry represented above in the client device's track log during the restore operation. Accordingly, the backup application may read various metadata of obj1 (such as the hashes of the blocks, ctime, mtime, backup identifier, and/or inode identifier) from the backup and then copy such metadata into the track log created (or recreated) during the restore operation.

Figure 5:
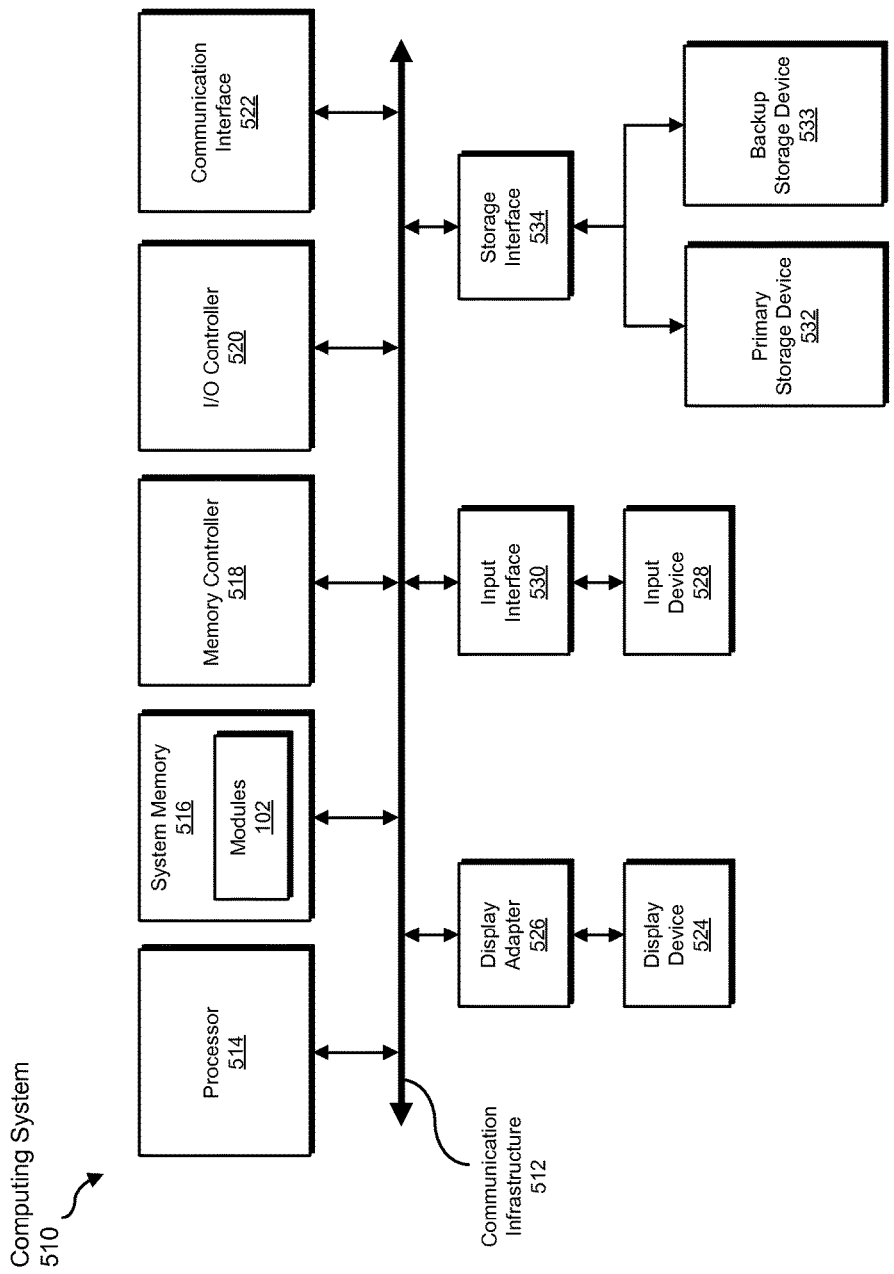
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
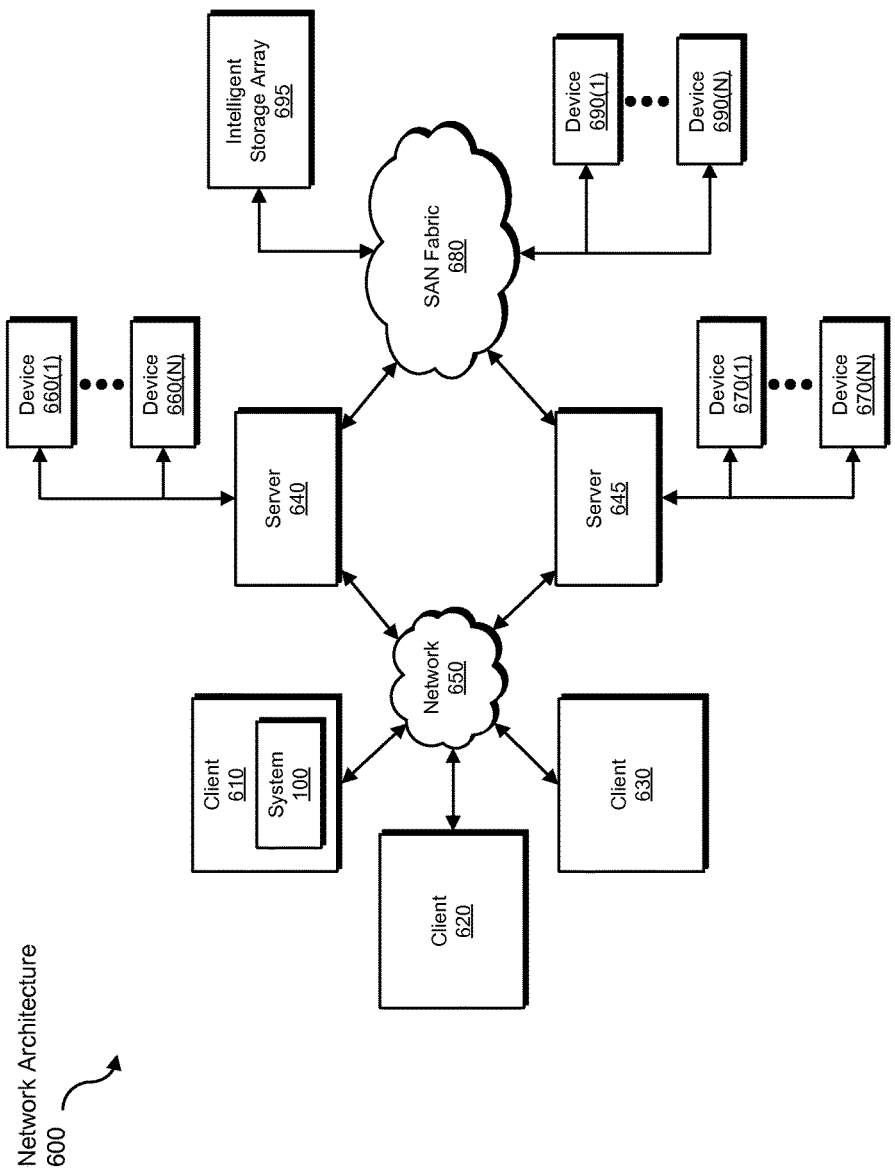
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for modifying track logs during restore processes.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive block data to be transformed, transform the block data, output a result of the transformation to a backup application, use the result of the transformation to record backup and restore operations, and store the result of the transformation to a track log. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for modifying track logs during restore processes, at least a portion of the method being performed by a computing device comprising at least one processor, the method comprising:

identifying:
  a backup application that maintains a track log that is used to identify changed blocks during backup operations and that represents a record of changes made to data stored on a computing system;
  a first incremental backup image that was created on a first date and that comprises a first version of a block and block information about the first version of the block stored in the first incremental backup image, wherein the block information comprises a timestamp of a most recent modification of the block by any process prior to a creation of the first incremental backup image; and
  a more recent incremental backup image that was created on a second date that is more recent than the first date and that comprises a modified version of the block from the first version of the block in the first incremental backup image;
detecting a restore process launched by the backup application to restore the first version of the block backed up in the first incremental backup image;
retrieving, from the first incremental backup image, the block information about the first version of the block being restored by the restore process that comprises the timestamp of the most recent modification of the block prior to the creation of the first incremental backup image;
recording the block information that comprises the timestamp of the most recent modification of the block prior to the creation of the first incremental backup image to the track log during the restore process;
reading, during a subsequent backup operation, the block information that was recorded to the track log during the restore process and that comprises the timestamp of the most recent modification of the block prior to the creation of the first incremental backup image in order to determine that:
  a most current version of the block does not match the modified version of the block in the recent incremental backup image; and
  the most current version of the block matches the first version of the block that is already backed up in the first incremental backup image; and
based on determining that the most current version of the block matches the first version of the block that is already backed up in the first incremental backup image, avoiding backing up a redundant copy of the most current version of the block despite the most current version of the block differing from the modified version of the block in the more recent incremental backup image.

2. The computer-implemented method of claim 1, wherein:
detecting the restore process launched by the backup application comprises detecting a restore process that restores a complete copy of the first incremental backup image to a computing system; and
recording the block information to the track log comprises creating a new track log for the backup application in connection with the restore process.

3. The computer-implemented method of claim 1, wherein:
detecting the restore process launched by the backup application comprises detecting a restore process that restores a partial copy of the first incremental backup image to a computing system; and recording the block information to the track log comprises modifying an existing track log for the backup application in connection with the restore process.

4. The computer-implemented method of claim 1, wherein:
retrieving the block information comprises retrieving a hash of the block being restored by the restore process; and
recording the block information to the track log comprises recording the hash of the block to the track log.

5. The computer-implemented method of claim 1, wherein:
retrieving the block information comprises retrieving object information about an object that contains the block; and
recording the block information to the track log comprises recording the object information to the track log.

6. The computer-implemented method of claim 5, wherein the object information comprises at least one of:
metadata about the object;
a size of the object;
an identifier of the object;
a timestamp of a backup image containing a stored image of the object;
an identifier of a backup image containing a stored image of the object; and
a hash of the object.

7. The computer-implemented method of claim 1, further comprising avoiding generating a new track log during the subsequent backup operation due at least in part to the track log updated by the restore operation.

8. A system for modifying track logs during restore processes, the system comprising:
an identification module, stored in memory, that identifies:
a backup application that maintains a track log that is used to identify changed blocks during backup operations and that represents a record of changes made to data stored on a computing system;
a first incremental backup image that was created at a first date and that comprises a first version of a block and block information about the first version of the block stored in the first incremental backup image, wherein the block information comprises a timestamp of a most recent modification of the block by any process prior to a creation of the first incremental backup image; and
a more recent incremental backup image that was created on a second date that is more recent than the first date and that comprises a modified version of the block from the first version of the block in the first incremental backup image;
a detection module, stored in memory, that detects a restore process launched by the backup application to restore the first version of the block backed up in the first incremental backup image;
a retrieval module, stored in memory, that retrieves, from the first incremental backup image, the block information about the first version of the block being restored by the restore process that comprises the timestamp of the most recent modification of the block prior to the creation of the first incremental backup image;
a recording module, stored in memory, that records the block information that comprises the timestamp of the most recent modification of the block prior to the creation of the first incremental backup image to the track log during the restore process;
a backup module, stored in memory, that:
reads, during a subsequent backup operation, the block information that was recorded to the track log during the restore process and that comprises the timestamp of the most recent modification of the block prior to the creation of the first incremental backup image in order to determine that:
a most current version of the block does not match the modified version of the block in the recent incremental backup image; and
the most current version of the block comprises the same timestamp as the first version of the block that is already backed up in the first incremental backup image; and
based on determining that the most current version of the block matches the first version of the block that is already backed up in the first incremental backup image, avoids backing up a redundant copy of the most current version of the block despite the most current version of the block differing from the modified version of the block in the more recent incremental backup image; and
at least one physical processor configured to execute the identification module, the detection module, the retrieval module, the recording module, and the backup module.

9. The system of claim 8, wherein:
the detection module detects a restore process that restores a complete copy of the first incremental backup image to a computing system; and
the recording module records the block information to the track log by creating a new track log for the backup application in connection with the restore process.

10. The system of claim 8, wherein:
the detection module detects a restore process that restores a partial copy of the first incremental backup image to a computing system; and
the recording module records the block information to the track log by modifying an existing track log for the backup application in connection with the restore process.

11. The system of claim 8, wherein:
the retrieval module retrieves the block information by retrieving a hash of the block being restored by the restore process; and
the recording module records the block information to the track log by recording the hash of the block to the track log.

12. The system of claim 8, wherein:
the retrieval module retrieves the block information by retrieving object information about an object that contains the block; and
the recording module records the block information to the track log by recording the object information to the track log.

13. The system of claim 12, wherein the object information comprises at least one of:
metadata about the object;
a size of the object;
an identifier of the object;
a timestamp of a backup image containing a stored image of the object;
an identifier of a backup image containing a stored image of the object; and
a hash of the object.

14. The system of claim 8, wherein the backup module does not record the block information to the track log during the subsequent backup operation due to the block information already being recorded to the track log by the restore process.

15. A non-transitory computer-readable medium comprising one or more computer-readable instructions that, when executed by at least one processor of a computing device, cause the computing device to:
   identify:
      a backup application that maintains a track log that is used to identify changed blocks during backup operations and that represents a record of changes made to data stored on a computing system;
      a first incremental backup image that was created on a first date and that comprises a first version of a block and block information about the first version of the block stored in the first incremental backup image, wherein the block information comprises a timestamp of a most recent modification of the block by any process prior to a creation of the first incremental backup image; and
      a more recent incremental backup image that that was created on a second date that is more recent than the first date and comprises a modified version of the block from the first version of the block in the first incremental backup image;
   detect a restore process launched by the backup application to restore the first version of the block backed up in the first incremental backup image;
   retrieve, from the first incremental backup image, the block information about the block being restored by the restore process that comprises the timestamp of the most recent modification of the block prior to the creation of the first incremental backup image;
   record the block information that comprises the timestamp of the most recent modification of the block prior to the creation of the first incremental backup image to the track log during the restore process;
   read, during a subsequent backup operation, the block information that was recorded to the track log during the restore process and that comprises the timestamp of the most recent modification of the block prior to the creation of the first incremental backup image in order to determine that:
      a most current version of the block does not match the modified version of the block in the recent incremental backup image; and
      the most current version the block matches the first version of the block that is already backed up in the first incremental backup image;
   based on determining that the most current version of the block matches the first version of the block that is already backed up in the first incremental backup image, avoid backing up a redundant copy of the most current version of the block despite the most current version of the block differing from the modified version of the block in the more recent incremental backup image.

16. The non-transitory computer-readable medium of claim 15, wherein the one or more computer-readable instructions cause the computing device to:
   detect a restore process that restores a complete copy of the first incremental backup image to a computing system; and
   create a new track log for the backup application in connection with the restore process.

17. The non-transitory computer-readable medium of claim 15, wherein the one or more computer-readable instructions cause the computing device to:
   detect a restore process that restores a partial copy of the first incremental backup image to a computing system; and
   modify an existing track log for the backup application in connection with the restore process.

18. The non-transitory computer-readable medium of claim 15, wherein the one or more computer-readable instructions cause the computing device to:
   retrieve a hash of the block being restored by the restore process; and
   record the hash of the block to the track log.

19. The non-transitory computer-readable medium of claim 15, wherein the one or more computer-readable instructions cause the computing device to:
   retrieve object information about an object that contains the block; and
   record the object information to the track log.

20. The non-transitory computer-readable medium of claim 19, wherein the object information comprises at least one of:
   metadata about the object;
   a size of the object;
   an identifier of the object;
   a timestamp of a backup image containing a stored image of the object;
   an identifier of a backup image containing a stored image of the object; and
   a hash of the object.

* * * * *